(12) United States Patent
Walker

(10) Patent No.: US 10,303,613 B2
(45) Date of Patent: *May 28, 2019

(54) CACHE ARCHITECTURE FOR COMPARING DATA

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,859

(22) Filed: Aug. 31, 2017

(65) Prior Publication Data

US 2017/0364444 A1    Dec. 21, 2017

Related U.S. Application Data

(63) Continuation of application No. 14/293,521, filed on Jun. 2, 2014, now Pat. No. 9,779,025.

(51) Int. Cl.
*G06F 12/00* (2006.01)
*G06F 12/0882* (2016.01)
(Continued)

(52) U.S. Cl.
CPC ...... *G06F 12/0882* (2013.01); *G06F 12/0864* (2013.01); *G06F 12/0866* (2013.01);
(Continued)

(58) Field of Classification Search
CPC ............. G06F 12/0882; G06F 12/0893; G06F 12/0866; G06F 12/0864; G06F 2212/3042;
(Continued)

(56) References Cited

U.S. PATENT DOCUMENTS

| | | | |
|---|---|---|---|
| 5,201,041 A | 4/1993 | Bohner et al. | |
| 5,367,653 A | 11/1994 | Coyle et al. | |

(Continued)

FOREIGN PATENT DOCUMENTS

| | | |
|---|---|---|
| CN | 102959529 | 3/2013 |
| WO | 03-025757 | 3/2003 |
| WO | 2013095404 | 6/2013 |

OTHER PUBLICATIONS

Notice of Rejection for related Korea Patent Application No. 10-2016-7036736, dated Jan. 19, 2018, 24 pages.

(Continued)

*Primary Examiner* — Hong C Kim

(74) *Attorney, Agent, or Firm* — Brooks, Cameron & Huebsch, PLLC

(57) ABSTRACT

The present disclosure includes apparatuses and methods for a cache architecture. An example apparatus that includes a cache architecture according to the present disclosure can include an array of memory cells configured to store multiple cache entries per page of memory cells; and sense circuitry configured to determine whether cache data corresponding to a request from a cache controller is located at a location in the array corresponding to the request, and return a response to the cache controller indicating whether cache data is located at the location in the array corresponding to the request.

20 Claims, 4 Drawing Sheets

(51) Int. Cl.
  *G06F 12/0864* (2016.01)
  *G06F 12/0866* (2016.01)
  *G06F 12/0893* (2016.01)
  *G06F 12/02* (2006.01)
  *G06F 12/0844* (2016.01)

(52) U.S. Cl.
  CPC ...... *G06F 12/0893* (2013.01); *G06F 12/0215* (2013.01); *G06F 12/0844* (2013.01); *G06F 2212/1021* (2013.01); *G06F 2212/1024* (2013.01); *G06F 2212/221* (2013.01); *G06F 2212/222* (2013.01); *G06F 2212/305* (2013.01); *G06F 2212/3042* (2013.01); *Y02D 10/13* (2018.01)

(58) Field of Classification Search
  CPC ............ G06F 12/0215; G06F 12/0844; G06F 2212/305; G06F 2212/222; G06F 2212/1021; G06F 2212/1024; G06F 2212/221; Y02D 10/13
  USPC .......................................... 711/128, 118, 144
  See application file for complete search history.

(56) References Cited

U.S. PATENT DOCUMENTS

| | | | |
|---|---|---|---|
| 5,577,223 | A | 11/1996 | Tanoi et al. |
| 5,652,723 | A | 7/1997 | Dosaka et al. |
| 5,715,426 | A | 2/1998 | Takahashi et al. |
| 5,905,996 | A | 5/1999 | Pawlowski |
| 6,678,815 | B1 | 1/2004 | Mathews |
| 9,779,025 | B2 * | 10/2017 | Walker ................ G06F 12/0882 |
| 2003/0005211 | A1 | 1/2003 | Armilli et al. |
| 2004/0024968 | A1 | 2/2004 | Lesartre |
| 2005/0232060 | A1 | 10/2005 | Miura |
| 2007/0233966 | A1 | 10/2007 | Chinthanmani et al. |
| 2009/0100231 | A1 | 4/2009 | Okabayashi et al. |
| 2009/0129138 | A1 | 5/2009 | Sumita |
| 2010/0023695 | A1 | 1/2010 | Guthrie et al. |
| 2010/0169578 | A1 | 7/2010 | Nychka et al. |
| 2011/0161641 | A1 | 6/2011 | Chen et al. |
| 2012/0215987 | A1 | 8/2012 | Loewenstein |
| 2012/0246410 | A1 | 9/2012 | Xu |
| 2012/0331197 | A1 | 12/2012 | Campbell |
| 2013/0138892 | A1 | 5/2013 | Loh et al. |
| 2013/0191601 | A1 | 7/2013 | Peterson et al. |
| 2013/0238856 | A1 | 9/2013 | Loh et al. |
| 2014/0032855 | A1 | 1/2014 | Shinozaki et al. |
| 2014/0040550 | A1 | 2/2014 | Nale et al. |
| 2014/0047175 | A1 | 2/2014 | Abali et al. |

OTHER PUBLICATIONS

Supplementary European Search Report for related EP Application No. 15803327.4, dated Dec. 22, 2017, 8 pages.

International Search Report and Written Opinion for related PCT International Application No. PCT/US2015/033474, dated Sep. 21, 2015, 15 pages.

Tanoi et al., "A 32-Bank 256-Mb DRAM with Cache and TAG," IEEE Journal of Solid-State Circuits, vol. 29, No. 11, Nov. 1994, pp. 1330-1335.

Qureshi et al., "Fundamental Latency Trade-offs in Architecting DRAM Caches," 45th International Symposium on Microarchitecture, Vancouver, BC, Dec. 2012, 12 pp.

Woo at al., "Heterogeneous Die Stacking of SRAM Row Cache and 3-D DRAM: An Empirical Design Evaluation", Circuits and Systems (MWSCAS), 2011 IEEE 54th International Midwest Symposium on Circuits and Systems, Seoul, South Korea, Aug. 7-10, 2011, 4 pp.

Loh et al., "Challenges in Heterogeneous Die-Stacked and Off-Chip Memory Systems", 3rd Workshop on SoCs, Heterogeneous Architectures and Workloads (SHAW), New Orleans, Louisiana, Feb. 2012, 6 pp.

Office Action for related Taiwan Patent Application No. 104117830, dated Aug. 9, 2016, 20 pages.

Office Action for related China Patent Application No. 201580013810.3, dated Jun. 29, 2018, 45 pages.

* cited by examiner

CACHE ARCHITECTURE FOR COMPARING DATA

PRIORITY INFORMATION

This application is a Continuation of U.S. application Ser. No. 14/293,521, filed Jun. 2, 2014, the contents of which are included herein by reference.

TECHNICAL FIELD

The present disclosure relates generally to semiconductor memory and methods, and more particularly, to apparatuses and methods for a cache architecture.

BACKGROUND

Memory devices are typically provided as internal, semiconductor, integrated circuits in computing devices or other electronic devices. There are many different types of memory including volatile and non-volatile memory. Volatile memory can require power to maintain its data (e.g., user data, error data, etc.) and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

A memory system can include a cache memory that may be smaller and/or faster than other memory of the system (e.g., DRAM, NAND, disk storage, solid state drives (SSD), etc., which may be referred to as main memory). As an example, cache memory may comprise DRAM memory. A memory system can cache data to improve performance of the memory system. Therefore providing cache memory that delivers improved performance for the memory system is desirable. Improving the latency and hit rate of the cache memory are performance characteristics that can provide improved performance of the memory system.

DETAILED DESCRIPTION

Figure 1:
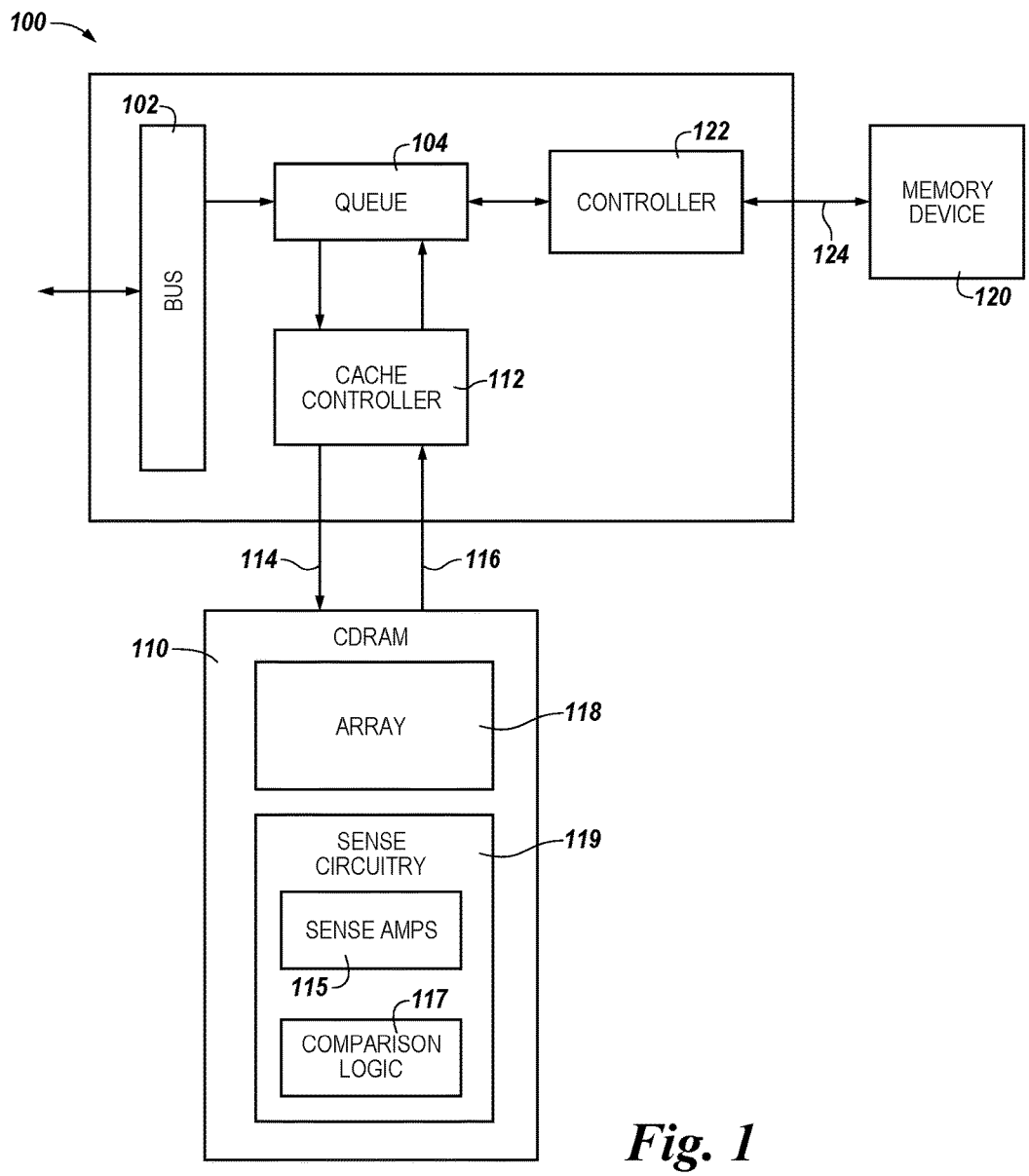
FIG. 1 illustrates a block diagram of an apparatus in the form of a system including a cache in accordance with a number of embodiments of the present disclosure.

The present disclosure includes apparatuses and methods for a cache architecture. An example apparatus that includes a cache architecture according to the present disclosure can include an array of memory cells configured to store multiple cache entries per page of memory cells. The apparatus can include sense circuitry configured to determine whether cache data corresponding to a request from a cache controller is located at a location in the array corresponding to the request, and return a response to the cache controller indicating whether cache data is located at the location in the array corresponding to the request.

In a number of embodiments, the cache architecture of the present disclosure can provide multiple cache entries mapped on to the same page (e.g., row) in a memory device (e.g., a CDRAM device, STT-RAM device, PCM device, for example, among other memory devices), which can allow for multiple cache entries to be checked in parallel on the memory device. In a number of embodiments, the cache architecture of the present disclosure can provide reduced energy consumption and/or improved latency as compared to previous approaches. For example, in a number of embodiments, comparison logic (e.g., comparators) can be embedded within sense circuitry, or elsewhere in the cache (e.g., CDRAM), to perform comparisons of multiple cache entries in parallel without transferring data (e.g., tag data and/or cache data) out of the CDRAM (e.g., via an input/output (I/O) line). Tag data from commands can be compared to tag data in cache entries of the CDRAM to determine if requested data is located in the CDRAM or if the CDRAM is ready to write data corresponding to a command to the CDRAM. Performing such comparisons using sense circuitry on the CDRAM can allow the commands to be executed without transferring data between the CDRAM and a cache controller, for instance. In a number of embodiments, a cache architecture can comprise dual (e.g., separate) interfaces (e.g., an input interface and an output interface) used to receive commands and to send responses.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "M", "N", "P", "R", and "S", particularly with respect to reference numerals in the drawings, indicates that a number of the particular feature so designated can be included. As used herein, "a number of" a particular thing can refer to one or more of such things (e.g., a number of memory devices can refer to one or more memory devices).

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. As will be appreciated, elements shown in the various embodiments herein can be added, exchanged, and/or eliminated so as to provide a number of additional embodiments of the present disclosure.

FIG. 1 is a block diagram of an apparatus in the form of a system 100 including a cache in accordance with a number of embodiments of the present disclosure. In FIG. 1, the cache can be a cache DRAM (CDRAM) device 110. In the example shown in FIG. 1, system 100 includes a memory device 120, a cache controller 112, a controller 122, a queue 104, and an interconnect bus 102. In a number of embodiments, the CDRAM device 110, the memory device 120, the cache controller 112, the controller 122, and the queue 104 may also be considered an apparatus. The CDRAM device 110 includes an array 118 of DRAM memory cells and sense circuitry 119. The sense circuitry 119 can include a number of sense amplifiers 115 and comparison logic 117 (e.g., a number of comparators) used in association with executing commands received by the CDRAM device 110. The CDRAM device 110 can be coupled to the cache controller 112 via input interface 114 and output interface 116. The input interface 114 can be used to receive information (e.g. commands and/or data) at the CDRAM device 110 from the cache controller 112. The output interface 116 can be used to send information from the CDRAM device 110 to the cache controller 112.

In a number of embodiments, the memory device 120 can include an array of memory cells, such as DRAM memory cells and/or NAND memory cells, for example, among other types of memory cells. The memory device 120 can serve as a backing store that stores data that can be cached by CDRAM device 110.

In a number of embodiments, the memory device 120 can be coupled to the controller 122 via bus 124. The bus 124 can be a shared bus 124 or can comprise a number of separate busses (e.g., address bus, data bus, control bus, etc.) to transfer information between the controller 122 and the memory device 120. In a number of embodiments, the system 100 can include a number of memory devices (e.g., memory device 120) and a number of controllers (e.g., controller 122) coupled together via bus 124.

In a number of embodiments, the system 100 can be coupled to a host (e.g., host processor) and/or other memory devices (not shown) via interconnect bus 102. The host and/or other memory devices can send data and/or commands to the queue 104 via interconnect bus 102. The system 100 can be a memory system that stores data in memory device 120 and uses the CDRAM memory device 110 to cache data from memory device 120. The system 100 can also cache data (e.g., in CDRAM device 110) received from a host and/or other memory devices via interconnect bus 102.

The system 100 can cache data by sending a command from the queue 104 to the CDRAM 110, for example. The command can be a read command or a write command, for instance. The command can be transferred from the queue 104 to the cache controller 112 and to the CDRAM 110 via input interface 114. The commands transferred via input interface 114 can include a command indicator, tag data (e.g., an address), and a transaction ID (TID).

In a number of embodiments, the CDRAM device 110 can process a read command by locating the particular cache entry (e.g., slot) indicated by the read command address. The CDRAM device 110 can include multiple cache entries on a single page, which can allow multiple cache entries to be checked by accessing (e.g., opening) a single page. In a number of embodiments, a cache page can include multiple cache entries, wherein each cache entry includes a portion of cached data from a backing store (e.g., memory device 120). Example cache pages and cache entries are described further below in association with FIGS. 2-4. The CDRAM device 110 can read the data corresponding to the indicated cache entry and use comparison logic (e.g., comparators) to determine if a validity indicator indicates data corresponding to the command is located at the address corresponding to the command, (e.g., if a valid bit of the cache entry is set and if a block address of the read command address matches the block address bits of the cache entry). If the valid bit is set and the block addresses match, then the slot can be considered a hit and the CDRAM 110 can return a suitable response to the cache controller 112 via output interface 116. The response to the cache controller 112 can include a TID and the cache data corresponding to the cache entry. Including the TID in the response can allow the cache controller 112 to identify the particular command to which the response corresponds. For instance, if the valid bit is not set and/or the block addresses do not match, then the cache entry can be considered a miss and the CDRAM 110 can return a suitable response to the cache controller 112 via output interface 116 indicating the cache data requested in the read command was not located in the CDRAM 110. The response to the cache controller 112 can include a TID, which can be used by the cache controller to identify the particular command to which the response corresponds.

In a number of embodiments, the CDRAM device 110 can process a write command by locating the particular cache entry (e.g., slot) indicated by the write command address. The CDRAM 110 can read the data corresponding to the indicated slot and use comparison logic located on the CDRAM device 110 to determine if a validity indicator indicates that valid data is located at the slot corresponding to the address in the command (e.g., if the valid bit in the slot is set and if the dirt bit in the slot is set). A determination that the valid bit is not set can indicate the slot is not storing valid data, such that the data corresponding to the write command can be written to the cache entry. A determination that the valid bit is set, but the dirty bit is not set can indicate the cache entry is storing valid data that is not different from the data in a backing store, as such the data from the write command can be written to the cache entry. A response can be sent to the cache controller indicating that the write has been completed. The response can include a transaction ID (TID) which can identify which particular command was completed. A determination that the valid bit is set and the dirty bit is set, can indicate that the data that is currently in the slot is to be evicted. Subsequent to eviction of the data from the slot, the data corresponding to the write command is written to the slot. A response can then be sent to the cache controller 112 that indicates the write has been completed. The response can include a TID and also the data and the address of the data that was evicted from the slot. The system 100 can then return this evicted data to a backing store (e.g., memory device 120).

Figure 2:
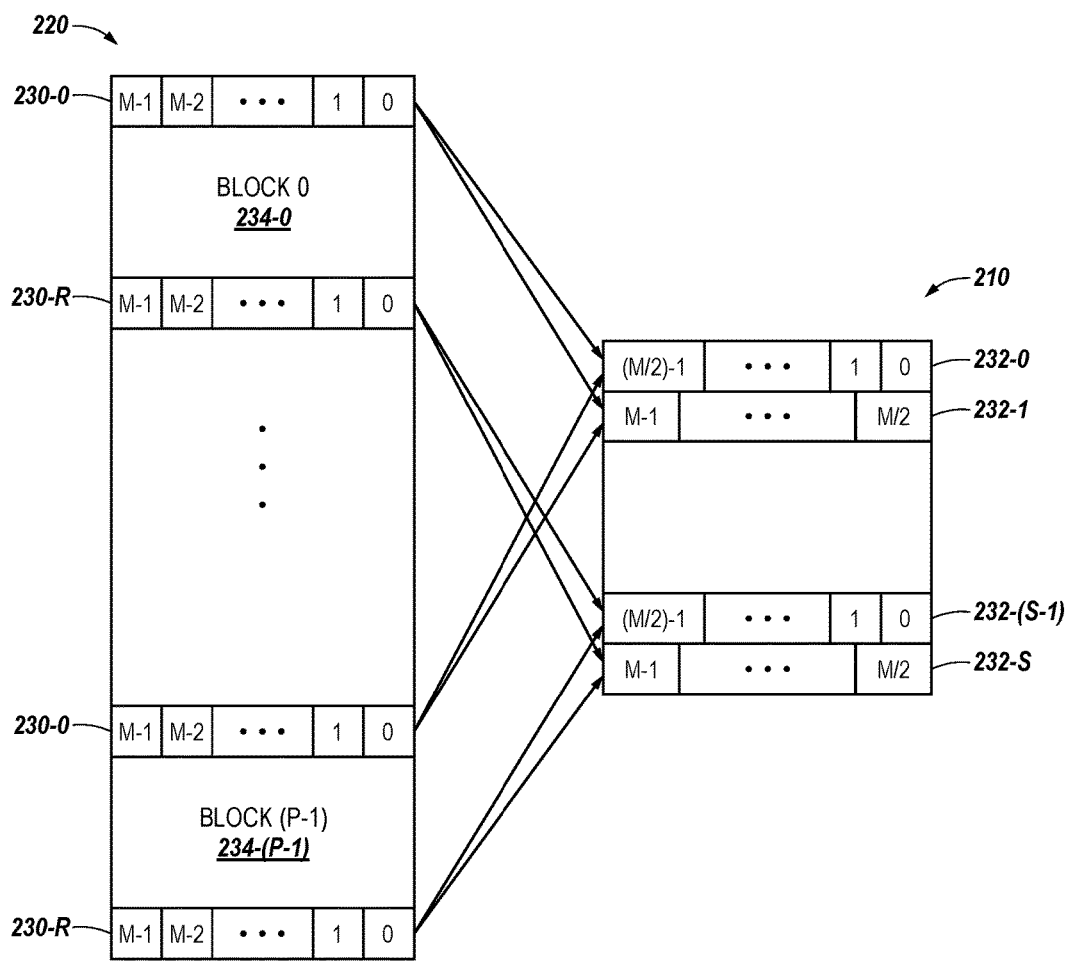
FIG. 2 is a block diagram illustrating mapping of data from a memory map of a memory device to cache in accordance with a number of embodiments of the present disclosure.

FIG. 2 is a block diagram illustrating mapping of data from a memory map of a memory device to cache in accordance with a number of embodiments of the present disclosure. The example shown in FIG. 2 illustrates direct mapping of data from memory device 220 to CDRAM device 210. The memory device 220 can include a number of blocks (e.g., block 234-0 and block 234-(P−1)) and each block can include a number of pages (e.g. page 230-0 and page 230-R) of memory cells. Each page of a block can be cached to the same location in the CDRAM device 210. For example, the first page of a block (e.g., page 230-0 from block 234-0 or block 234-(P−1)), can be cached to the first two pages of the CDRAM device 210 (e.g., page 232-0 and 232-1). Data in locations M−1 to M/2 from page 230-0 can be mapped and cached to page 232-1 of CDRAM device 210. In a number of embodiments, one page from a memory device can be mapped to the first two pages of a CDRAM device (e.g., if a page in the memory device is twice as big as a page in the CDRAM device). For example, a 4 KB page of a particular memory device can be mapped into two 2 KB pages of a CDRAM device. In FIG. 2, page 230-0 from memory device 220 is mapped to pages 232-0 and 232-1 in CDRAM device 210. The first half of page 230-0 is mapped to page 232-1 and the second half of page 230-0 is mapped to page 232-0. Also, in FIG. 2, the last page of block in memory device 220 (e.g., page 230-R) is mapped to the last two pages in CDRAM 210 (e.g., pages 232-(S−1) and 232-S). The first half of page 230-R is mapped to page 232-S and the second half of page 230-R is mapped to page 232-(S−1).

Embodiments of the present disclosure are not limited to direct mapping. For instance, the CDRAM device 210 can serve as an N-way associative cache. That is associativity can be used to map data from a memory device N-ways to a CDRAM device. The CDRAM device can be configured so that each of the locations for a cache entry (e.g., slots) corresponding to a particular portion of data from a memory device can be mapped to the same page in the CDRAM device. Therefore, when locating data in the CDRAM device, each location, e.g. slot, where requested data could be located is on a same page in the CDRAM. As such, only one page needs to opened, read, and have its tag data compared to tag data from a command to determine if the requested cache data is located at any one of the possible locations for a cache entry in the CDRAM device that corresponds to a particular portion of data from a memory device.

Figure 3:
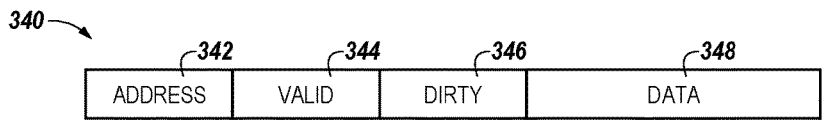
FIG. 3 illustrates a cache entry in cache in accordance with a number of embodiments of the present disclosure.

FIG. 3 illustrates a cache entry in cache in accordance with a number of embodiments of the present disclosure. In a number of embodiments, a page in cache, such as CDRAM, can comprise a number (e.g., multiple) of cache entries (e.g., slots). Each slot can include a portion of data that is cached from a memory device, along with tag data (e.g., an address, a valid bit, and a dirty bit). In FIG. 3, slot 340 includes tag data which includes an address 342, a valid bit 344, and a dirty bit 346. Slot 340 also includes data 348 (e.g., cache data). The address 342 includes a number of bits that indicate the block, page, and slot of slot 340. The valid bit 344 includes a bit that indicates whether the data in the slot is valid (e.g., includes data that is currently being cached by the CDRAM) and the dirty bit 346 includes a bit that indicates whether the data in the slot has changed, but has not been written to a backing store. Data 348 can include a number of bits that represent the cache data stored in the slot 340.

Figure 4A:
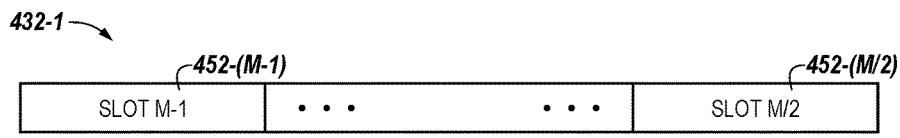
FIGS. 4A and 4B illustrate the contents of a page in cache in accordance with a number of embodiments of the present disclosure.
Figure 4B:
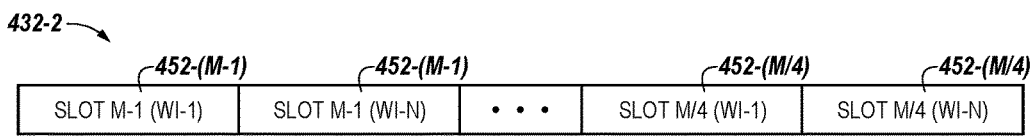

FIGS. 4A and 4B illustrate the contents of a page in cache in accordance with a number of embodiments of the present disclosure. In FIG. 4A, cache page 432-1 can include a number of cache entries (e.g., slot 452-(M−1) and 452-M/2). Each of the slots can include tag data, which includes an address, a valid bit, and a dirty bit; and also cache data. For example, page 432-1 can cache data that corresponds to a first half of a page of data from a backing store (e.g., if the page of data from the backing store is twice as big as cache page 432-1.

In FIG. 4B, cache page 430 can include a number of cache entries (e.g., slot 452-(M−1) and 452-M/4). Each of the slots can include tag data, which includes an address, a valid bit, and a dirty bit, and also cache data, along with a way index (WI). A way index (e.g. WI-1 or WI-N) can be used to indicate a particular slot of a number of potential slots in which requested data could be located when CDRAM is using N-way associativity, for instance. In this example, page 432-2 can include a number of slots that can each store data corresponding to a quarter of a page of data from a backing store (e.g., if the page of data from the backing store is twice as big as cache page 432-2 and the cache page 432-2 is mapped with 2-way associativity). In FIG. 4B, cache page 432-2 illustrates 2-way associativity in which data corresponding to location M−1 from a memory device (e.g., a backing store) could be located in either of slots 452-(M−1) having corresponding way index WI-1 or WI-N and data corresponding to location M/4 from a memory device could be located in either of slots 452-(M/4) having way index WI-1 or WI-N. In a number of embodiments, the CDRAM can accommodate various degrees of associativity (e.g., N-way associativity).

Figure 5:
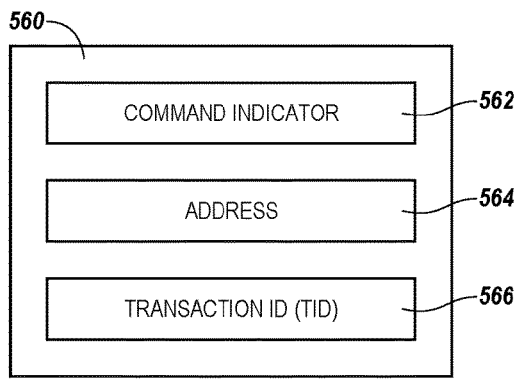
FIG. 5 illustrates a command associated with an apparatus comprising cache in accordance with a number of embodiments of the present disclosure.

FIG. 5 illustrates a command 560 associated with an apparatus comprising cache in accordance with a number of embodiments of the present disclosure. Command 560 can be a read command or a write command, for instance. The command 560 can include a command indicator 562, which indicates the command type (e.g., read command or write command). The command 560 can also include tag data that includes an address 564, which indicates the block, page, and/or slot of the data that is associated with the command 560. The command 560 also includes a transaction ID (TID) 566 that can be used by the cache controller and/or the CDRAM device to identify the command corresponding to data that is passed between the cache controller and the CDRAM device.

As an example, command 560 can be a read command can be received by a CDRAM device. The CDRAM device can process the command by locating the particular cache page indicated in the command and opening that page. A particular slot indicated in the command can be located in the cache page that was opened and tag data in the particular slot can be read. Comparison logic on the CDRAM device can be used to check if the valid bit in the slot is set and if the block address in the command's address matches the block address bits in the slot. If the valid bit is set and the block addresses match, then the slot can be considered a hit and the CDRAM can return a suitable response to the cache controller. The response to the cache controller can include a TID and the cache data from the particular slot. If the valid bit is not set and/or the block addresses do not match, then the slot is considered a miss and the CDRAM can return a suitable response to the cache controller (e.g., a response indicating that the data requested in the read command was not located in the CDRAM).

In a number of embodiments, a CDRAM 110 can process a write command by locating the slot indicated in the write command's address. The CDRAM (e.g., 110) can read the data at the slot and use comparators to check if the valid bit in the slot is set and if the dirt bit is set. If the valid bit is not set, then the data from the write command can be written to the slot. If the valid bit is set, but the dirty bit is not set, then the data from the write command can be written to the slot. A response can be sent to a cache controller (e.g., 112) indicating that the write has been completed. The response can include a transaction ID (TID) which can be used by the cache controller (e.g., 112) to identify which particular command was completed. A determination that the valid bit is set and the dirty bit is set can indicate that cache data that is currently in the slot needs to be evicted. Upon eviction of the cache data from the slot, the cache data from the write command can be written to the slot. A suitable response can then be sent to a cache controller indicating that the write has been completed. The response can include a transaction ID (TID) and also the data and the address of the data that was evicted from the slot. The evicted data can be returned from the CDRAM to a backing store (e.g. memory device 120).

Figure 6A:
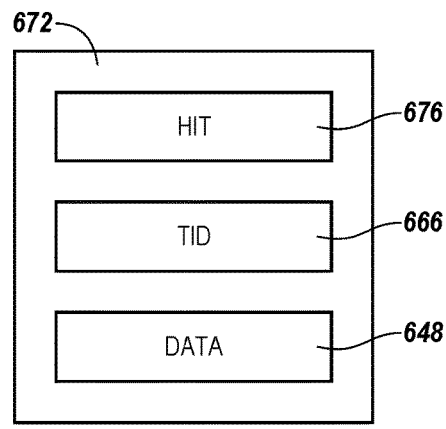
FIGS. 6A-6B illustrate responses to a read command associated with an apparatus comprising cache in accordance with a number of embodiments of the present disclosure.
Figure 6B:
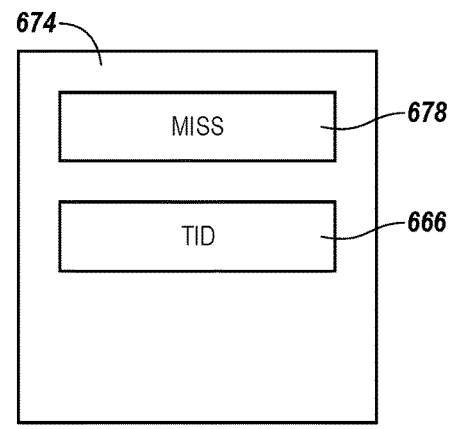

FIGS. 6A-6B illustrate responses to a read command associated with an apparatus comprising cache in accordance with a number of embodiments of the present disclosure. FIG. 6A illustrates a response 672 to a read command that was a hit. In FIG. 6A, response 672 includes a hit indicator 676, a transaction ID (TID) 666, and data 648. The hit indicator 676 can indicate that the data requested in the read command was found in the CDRAM. The transaction ID 666 can be used to identify the command associated with the response 672. The data 648 can be the cache data requested in the read command that was read from the CDRAM. The response 672 can be sent on an output interface from a CDRAM device to a cache controller in response to the CDRAM device processing a command. The CDRAM device can process a command without sending data (e.g., tag data) between the CDRAM device and the cache controller during processing of the command.

FIG. 6B illustrates a response 674 to a read command that was a miss. In FIG. 6B, response 674 includes a miss indicator 678 and a transaction ID (TID) 666. The miss indicator 678 can indicate that the data requested in the read command was not found in the CDRAM. The transaction ID 666 can be used to identify the command associated with the response 674. The response 674 can be sent on an output interface from a CDRAM device to a cache controller in response to the CDRAM device processing a command. The CDRAM device can process a command without sending data (e.g., tag data) between the CDRAM device and the cache controller during processing of the command.

Figure 7A:
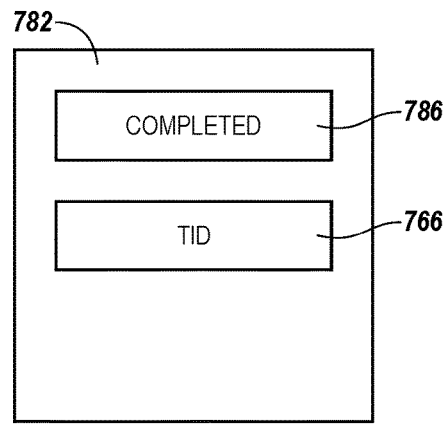
FIGS. 7A-7B illustrate responses to a write command associated with an apparatus comprising cache in accordance with a number of embodiments of the present disclosure.
Figure 7B:
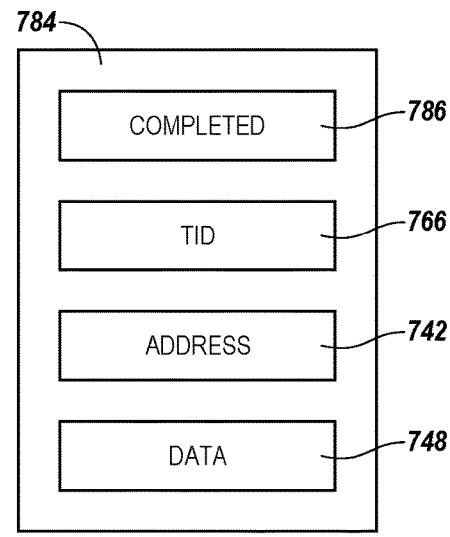

FIGS. 7A-7B illustrate responses to a write command associated with an apparatus comprising cache in accordance with a number of embodiments of the present disclosure. FIG. 7A illustrates a response 782 to a write command that wrote data to a slot where either the valid bit or the dirty bit was not set, e.g., data was not evicted when executing the write command. In FIG. 7A, response 782 includes a write completed indicator 786 and a transaction ID (TID) 766. The write completed indicator 786 can indicate that the data in the write command was written to the CDRAM. The transaction ID 766 can be used to identify the command associated with the response 782. The response 782 can be sent on an output interface from a CDRAM device to a cache controller in response to the CDRAM device processing a command. The CDRAM device can process a command without sending data (e.g., tag data) between the CDRAM device and the cache controller during processing of the command.

FIG. 7B illustrates a response 784 to a write command that wrote data to a slot where the valid bit and the dirty bit was set, e.g., data was evicted when executing the write command. In FIG. 7B, response 784 includes a write completed indicator 786, a transaction ID (TID) 766, and address 742 of the data that was evicted, and the data 748 that was evicted from a slot. The write completed indicator 786 can indicate that the data in the write command was written to the CDRAM. The transaction ID 766 can be used to identify the command associated with the response 782. The address 742 of the data that was evicted and the data 748 that was evicted can be read from the slot by the CDRAM device and sent to the cache controller in the response 784 so the evicted data can be written to a memory device. The response 784 can be sent on an output interface from a CDRAM device to a cache controller in response to the CDRAM device processing a command. The CDRAM device can process a command without sending data (e.g., tag data) between the CDRAM device and the cache controller during processing of the command.

The present disclosure includes apparatuses and methods for a cache architecture. An example apparatus that includes a cache architecture according to the present disclosure can include an array of memory cells configured to store multiple cache entries per page of memory cells; and sense circuitry configured to determine whether cache data corresponding to a request from a cache controller is located at a location in the array corresponding to the request, and return a response to the cache controller indicating whether cache data is located at the location in the array corresponding to the request.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   an array of memory cells configured to store multiple cache entries per page of memory cells; and
   sense circuitry configured to:
      determine whether cache data corresponding to a request from a cache controller is located in at least one of a plurality of locations in the array corresponding to the request by:
         opening a single page in the array that includes a plurality of slots where each of a plurality of ways associated with the cache data corresponding to the request are located, wherein the single page is located based on information in the request; and
         comparing tag data associated with the plurality of ways that is read from the single page in the cache to tag data from the request using comparison logic located on the cache, wherein the tag data read from the single page in the array is the only tag data read and wherein the plurality of locations in the array correspond to a particular location in a memory device that is mapped to the plurality of locations in the array where the data corresponding to the request is also located.

2. The apparatus of claim 1, wherein the apparatus is configured to return cache data corresponding to the request in response to a determination that the cache data is located in at least one of the plurality of locations in the array corresponding to the request.

3. The apparatus of claim 1, wherein the apparatus is configured to write cache data corresponding to the request in the array of memory cells in response to a status of a validity indicator indicating that valid data is not in at least one of the plurality of locations in the array corresponding to the request.

4. The apparatus of claim 1, wherein the apparatus is configured to evict dirty data from the array in response to a status of a validity indicator indicating that valid data is in at least one of the plurality of locations in the array corresponding to the request.

5. The apparatus of claim 4, wherein the apparatus is configured to write cache data corresponding to the request in at least one of the plurality of locations in the array subsequent to evicting dirty data from at least one of the plurality of locations in the array of memory cells.

6. The apparatus of claim 1, wherein the apparatus is configured to determine whether cache data is located in at least one of the plurality of locations in the array corresponding to the request without sending tag data to the cache controller.

7. The apparatus of claim 1, wherein each cache entry of the number of cache entries are stored in one of a number of slots on one of a number of pages of the array of memory cells.

8. The apparatus of claim 7, wherein each cache entry of the multiple cache entries include respective cache data and tag data.

9. The apparatus of claim 7, wherein tag data comprises an address corresponding to a backing store, a valid bit, and a dirty bit.

10. The apparatus of claim 7, wherein each cache entry of the multiple cache entries includes a respective way index.

11. A method for operating cache, comprising:
receiving a read request from a cache controller;
determining whether cache data corresponding to the read request is located in the cache by:
opening a single page in the cache that includes a plurality of slots where each of a plurality of ways associated with the cache data corresponding to the read request are located; and
comparing tag data associated with the plurality of ways read from the single page in the cache to tag data from the read request using comparison logic located on the cache,
wherein the tag data read from the single page in the cache is located in the cache based on information in the read request from the cache controller, and wherein the single page in the cache corresponds to a particular location in a memory device that is mapped to the single page in the cache where the data corresponding to the request is also located.

12. The method of claim 11, wherein the method includes returning the cache data from the read request to the cache controller in response to a determination, by the comparison logic, that the cache data corresponding to the read request is located in the cache.

13. The method of claim 11, wherein returning the response includes providing an indication in the response that indicates the cache data is not located in the cache in response to a validity indicator indicating that valid data is not located in the cache at the location corresponding to the read request.

14. The method of claim 11, wherein returning the response includes providing an indication in the response that indicates the cache data is not located in the cache in response to tag data associated with the read request not matching tag data read from the single page.

15. The method of claim 11, wherein returning the response includes returning a transaction identifier (TID).

16. An apparatus, comprising:
a memory device coupled to a controller; and
a cache comprising an array of memory cells and sense circuitry, wherein the cache is coupled to a cache controller via an input interface and an output interface, and wherein the cache is configured to:
receive a command via the input interface;
process the command by:
locating a particular page in the cache, indicated by the command, that includes a plurality of slots where each of a plurality of ways associated with cache data corresponding to the command are located, wherein the particular page in the cache corresponds to a particular location in a memory device that is mapped to at least one of a plurality of locations in the particular page in the cache where the data corresponding to the command is also located,
reading data from only the particular page, and comparing tag data associated with the plurality of ways read from the particular page in the cache to tag data from the command; and
return a response to the cache controller, via the output interface, indicating whether data associated with the command is located in the cache.

17. The apparatus of claim 16, wherein the sense circuitry includes comparison logic to determine if data corresponding to the command is located in at least one of the plurality of locations in the particular page in the cache corresponding to the command.

18. The apparatus of claim 16, wherein the cache is configured to process the command without transferring tag data to the cache controller.

19. The apparatus of claim 16, wherein the cache is configured to process the command by checking multiple cache entries in parallel logic from only the particular page to determine if data corresponding to the command is located in the cache corresponding to the command.

20. The apparatus of claim 16, wherein the particular page in the cache corresponds to a particular location in a memory device that is mapped to at least one of a plurality of locations in the particular page in the cache where the data corresponding to the command is also located.

* * * * *